United States Patent [19]

Erickson

[11] Patent Number: 4,614,605

[45] Date of Patent: Sep. 30, 1986

[54] WATER VAPOR ABSORBENT CONTAINING CESIUM HYDROXIDE

[76] Inventor: Donald C. Erickson, 1704 S. Harbor La., Annapolis, Md. 21401

[21] Appl. No.: 711,233

[22] Filed: Mar. 13, 1985

[51] Int. Cl.$^4$ .......................... C09K 5/04; F25B 15/16
[52] U.S. Cl. ........................................ 252/69; 62/101; 62/109; 62/112; 62/476; 252/68; 252/71; 423/635; 423/641
[58] Field of Search ................. 62/101, 109, 112, 476; 252/68, 69, 71; 423/635, 641

[56] References Cited

U.S. PATENT DOCUMENTS

| | | | |
|---|---|---|---|
| 2,019,290 | 10/1935 | Brace | 252/69 |
| 2,210,496 | 8/1940 | Peltier | 252/69 |
| 2,795,115 | 6/1957 | Kumm | 62/5 |
| 3,004,919 | 10/1961 | Rush et al. | 252/67 |
| 3,541,013 | 11/1970 | Macriss et al. | 62/112 |
| 4,151,721 | 5/1979 | Kumm | 62/2 |
| 4,402,795 | 9/1983 | Erickson | 203/25 |

FOREIGN PATENT DOCUMENTS 1070148  1/1984  U.S.S.R. ................. 252/71

OTHER PUBLICATIONS

Razuvaev et al., "Study of the Electric Conductivity of the Cesium Hydroxide-Potassium Hydroxide-Water Ternary System at −60°−+95° C.," Elektrokhimiya 1976, 12(8), 1343, (CA 85:149823).
Sadokhina et al., "Cesium Hydroxide-Sodium Hydroxide-Water System at 25°", Zh. Neorg. Khim. 1980, 25(8), 2285-87, (CA 93:192915).

Primary Examiner—Paul Lieberman
Assistant Examiner—Robert A. Wax

[57] ABSTRACT

A water vapor absorbing composition containing CsOH is disclosed which is useful in absorption cycle heat pumping processes and apparatus. When combined with at least one of KOH and NaOH, the absorbent makes possible exceptionally high lifts of the temperature of heat which is initially at low ambient temperatures. Acceptably low corrosion rates are achieved with standard materials of construction using ordinary corrosion inhibitors.

14 Claims, 1 Drawing Figure

WATER VAPOR ABSORBENT CONTAINING CESIUM HYDROXIDE

DESCRIPTION

TECHNICAL FIELD

This invention relates to solution compositions which absorb and desorb useful quantities of water vapor at high boiling point elevations and particularly at low temperatures. Such compositions are useful in many types of regenerative absorption cycle devices, such as absorption chilling units and absorption heat pumps (forward and reverse cycle). They are particularly useful for heat pumping low temperature heat (0°–20° C.) to temperatures useful for space heating (50°–95° C.).

BACKGROUND ART

The history of and uses of absorption cycles in general, and in particular the application of NaOH and/or KOH to absorption cycles, is summarized briefly in copending application Ser. No. 06/658,540 filed 10/09/84 by Donald C. Erickson, now abandoned, which is incorporated by reference.

U.S. Pat. No. 2,795,115 recites the use of "solutions of one or more of the soluble basic hydroxides: for example, sodium and potassium hydroxides" in an air-cooled absorption refrigeration cycle. That patent discloses that "using the ambient air for cooling is shown to be practical only in the case of sodium hydroxide or other basic hydroxide solutions of similar absorption characteristics to the sodium hydroxide solution displayed in FIG. 3". FIG. 3 illustrates a substance which at a water vapor pressure of 6 mm Hg (40° F. evaporator) does not precipitate to solid until the temperature is above 320° F.

Other U.S. Patents which recite the use of aqueous NaOH in an absorption cycle to produce refrigeration include U.S. Pat. Nos. 4,151,721 and 2,497,819.

In the report "Candidate Chemical Systems for Air Cooled, Solar Powered, Absorption Air Conditioner Design", SAN-1587-2, by W. J. Biermann of Carrier Corp. (April 1978), the possibility of the use of "the very soluble alkali metal (except lithium) hydroxides" as absorbents is considered. Thermodynamic data somewhat different from that of FIG. 3 referred to above is presented, and ascribed to NaOH. The report concludes that, "Its thermodynamic promise is marginal and the generally corrosive properties of strong caustic soda lead to a decision to reject."

The basic hydroxides were experimented with and temporarily put into actual use as absorbents in the late 1800s. In the mid 1950's they were suggested for air-cooled refrigeration use, and more recently for heating and heat storage. Yet as of 1978 they are not in commercial use and recommended not to be used.

It has now been discovered that there are several good reasons why the previously disclosed solutions are not in use, and that those problems are only avoided by the solutions newly disclosed herein, and containing CsOH.

Air cooled air conditioning requires that an absorption heat pump absorb heat at 4° to 8° C. and reject the heat at 45° to 60° C. Hot water heating and residential space heating require similar conditions. Building or district heating requires even hotter delivery temperatures, e.g., 65° to 95° C. All of these applications are beyond the capability of existing absorbents, as typified by LiBr.

The FIGURE depicts the approximate solubility limits of two known absorbents: LiBr and NaOH. As shown, for a 6 mm Hg water vapor pressure (corresponding to a 5° C. evaporator temperature) NaOH solidifies at 44° C. and LiBr at 53° C. KOH has approximately the same solubility limit as LiBr at this pressure. After allowing a prudent operating margin of about 15° C. from crystallization, it can be seen that these absorbents are totally unsuited for the applications outlined above. Even should NaOH be operated with a 10° C. evaporator, which increases the water vapor pressure to 9.2 mm Hg, and increases the solubility limit to 84° C., there still remain problems with NaOH. In addition to the corrosion problem, there is the startup and shutdown problem. Starting from any NaOH concentration which takes advantage of its extended solubility limit beyond LiBr, and cooling that concentration to ambient temperature, the crystallization (i.e., solid precipitation) temperature is encountered first. Should this happen, the absorbent must be remelted prior to subsequent startup, which can be extremely difficult.

The application cited above discloses that certain mixture proportions of NaOH and KOH will both suppress the "hump" of NaOH sufficiently to allow 5° C. evaporator operation without crystallizing at the hump, and also extend the overall solubility limit beyond that of NaOH neglecting the hump. However, when sufficient NaOH is retained in the mixture to achieve this extension of solubility limit, a hump will still be present sufficiently so as to cause solidification upon cooling to ambient. The NaOH-KOH solubility limit curve of the FIGURE, representing approximately 75% NaOH and 25% KOH, illustrates this problem.

In addition to corrosiveness, there is still another problem with absorbent mixtures consisting primarily of NaOH. This is the limited solubility of sodium carbonates and bicarbonates. Upon exposure to air, e.g., due to maintenance or a leak, the absorbent turns cloudy due to carbonate precipitation. This could clog nozzles, valves, and the like.

What is needed is an absorbent which has a solubility limit comparable to or even greater than that of NaOH, to enable it to serve the high lift applications from low temperature described above, yet still be able to cool to ambient temperature without crystallization, to accept corrosion inhibitors without serious degradation, and be exposed to trace amounts of $CO_2$ without solids precipitation. No previously identified aqueous absorbent has satisfied these requirements.

DISCLOSURE OF INVENTION

The aqueous absorbent solution that has been discovered to provide the above advantages consists of water, CsOH, and at least one of KOH and NaOH. Combinations of CsOH with either KOH or NaOH singly are advantageous, especially KOH. Even more advantageous, in regard to extended solubility limit, are combinations of all three hydroxides. Minor amounts of other absorbents or hygroscopic agents may also advantageously be present, including RbOH and alkaline earth hydroxides. Particularly advantageous is the inclusion of minor amounts of corrosion inhibiting substances such as the oxyanion salts of the alkali metals. Examples are chromates, molybdates, manganates, tungstates, arsenates, antimonates, phosphates, carbonates, vanadates, nitrites, and most preferably nitrates. The absorbent finds particularly advantageous application in hermetically sealed absorption cycle apparatus for elevating the temperature of heat (i.e., causing thermal energy to flow) from the 0°-20° C. range to the 60°-95° C. range.

BRIEF DESCRIPTION OF THE DRAWING

The single FIGURE depicts approximate pressure-temperature-concentration data for three absorbents and solubility limit data for four absorbents: LiBr, NaOH, binary NaOH-KOH, and one newly disclosed ternary CsOH-KOH-NaOH mixture. The coordinates of FIG. 1 are RT ln P vs T. The use of those coordinates to depict equilibrium pressure-temperature-composition data of fluids is further described in U.S. Pat. No. 4,402,795.

BEST MODE FOR CARRYING OUT THE INVENTION

Figure 1:
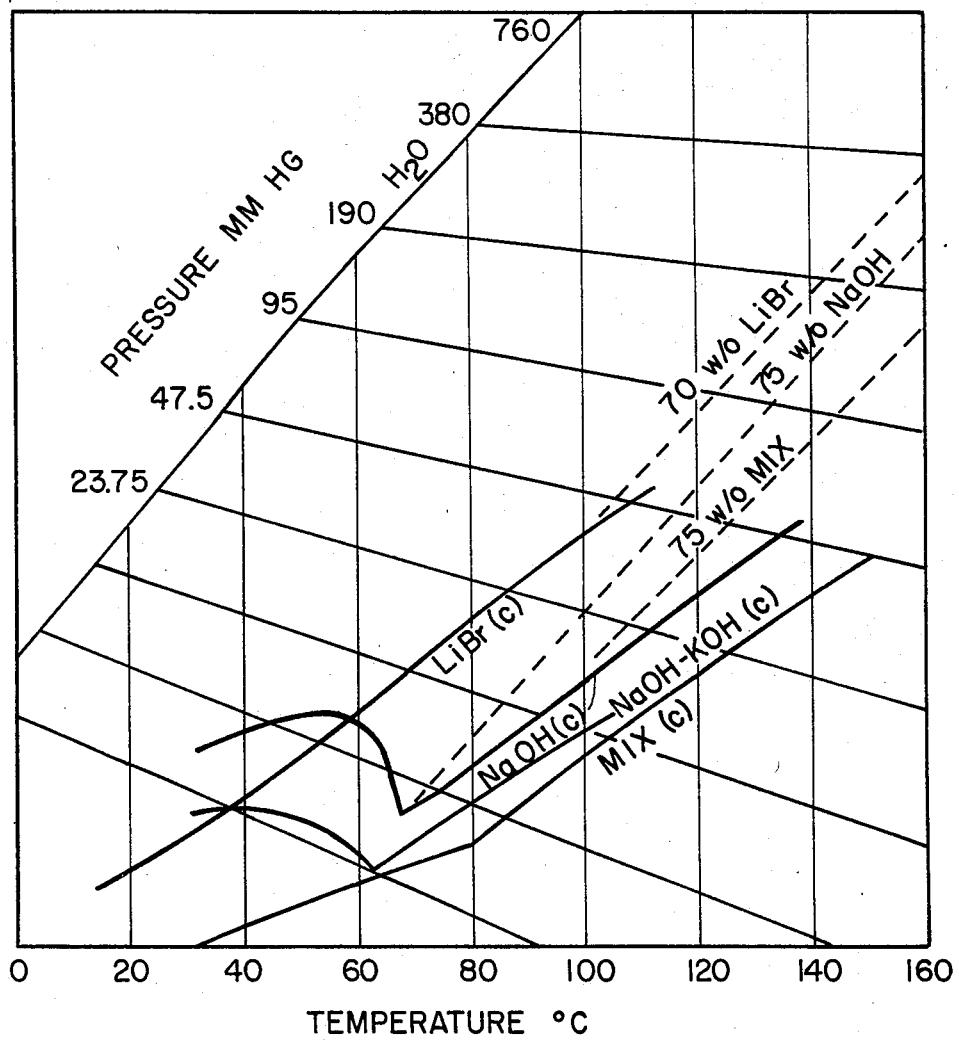

The proportion of CsOH in the mixture and the amount and type of other constituents will vary according to the combination of thermodynamic properties desired for the particular application. For example, excluding NaOH from the absorbent provides minimal susceptibility to $CO_2$ absorption/carbonate precipitation, and excellent solubility at low temperature shutdown conditions. On the other hand, its maximum lift capability (solubility limit) at operating conditions (e.g., at 5 mm Hg water vapor pressure) is much more limited than if NaOH were present in the mixture. In general, CsOH concentrations between 3 and 60 weight percent (anhydrous basis) are contemplated, with the 10 to 25% range of greatest interest as providing maximum benefit for minimum cost. The preferred concentration range for the KOH and for the NaOH is 20 to 80 weight percent of the anhydrous component of the absorbent. The usual water concentration in the absorbent will be between 5 and 50 weight percent.

The thermodynamic characteristics illustrated in the FIGURE were obtained with a composition of 14% CsOH, 26% KOH, and 65% NaOH (weight basis). As shown in the FIGURE, this composition is only slightly more concentrated than NaOH at a given boiling point elevation, and provides a solubility limit greater than for either NaOH or binary NaOH-KOH, while reducing or eliminating the cooldown solidification problem that the latter two experience. Furthermore, when the proportion of CsOH and KOH is sufficiently high, the phase change on exceeding the solubility limit is to a gel rather than to a crystalline solid. This allows closer approaches to the solubility limit.

The absorption cycle apparatus making use of this newly disclosed family of absorbents may be of conventional and well known type, either continuous or intermittent cycle, and for producing refrigeration, heat, or both. The continuous cycle apparatus would normally be comprised of an absorber, generator, evaporator, and condenser. The fluid circuits should preferably be hermetically sealed to prevent contamination with atmospheric $CO_2$. When producing heat, both the absorber and condenser will normally deliver useful heat. When producing refrigeration, they will optionally deliver reject heat to the atmosphere via air cooling.

Since the greatest benefit of this absorbent is providing high lifts from low temperatures, it will normally operate at low pressure in the evaporator and absorber. Thus special measures may be present to minimize the pressure drop between those two components, such as locating them in the same shell, and using surface enhancement and absorption enhancement techniques such as falling films, trickle beds, and the like. The evaporator may actually operate somewhat below 0° C., in which case the water would require a small amount of freezing point depressant. This could be some of the absorbent itself, or alternatively another substance such as methanol which increases the vapor pressure in addition to lowering the freezing point.

The corrosion inhibitors generally have a very detrimental effect on the solubility limit, and accordingly can only be present at the 1 to 3% level or less. Thus they will generally be present at concentrations between 0.1% and 5%. Alkali metal nitrate appears to be the best choice, and has provided excellent protection to stainless steel at 200° C. at the 3% level. Even higher temperatures and/or lower nitrate levels are possible if the high temperature components are made of nickel, Inconel 600, or nickel plated material.

It has also been found that $CsNO_3$ has a similar beneficial effect on alkali metal nitrate mixtures as does CsOH on alkali metal hydroxide mixtures, i.e., a substantial improvement in solubility limit from a relatively minor (on the order of 20%) addition.

I claim:

1. An absorption cycle apparatus wherein the working fluid is water and wherein the improvement comprises an absorbent comprised of an aqueous mixture of cesium hydroxide plus at least one of potassium hydroxide and sodium hydroxide.

2. The apparatus according to claim 1 wherein the CsOH comprises between 3 and 60 weight percent of the anhydrous component of the absorbent.

3. The apparatus according to claim 2 wherein the absorbent contains both KOH and NaOH.

4. The apparatus according to claim 3 wherein the KOH and NaOH each comprise between 20 and 80 weight percent of the anhydrous absorbent.

5. The apparatus according to claim 2 wherein the absorbent is further comprised of between 0.1% and 5% of corrosion inhibitor.

6. The apparatus according to claim 2 further adapted and designed so as to maintain a hermetic boundary between the fluid circuits and the atmosphere.

7. A process for transferring heat from low to high temperature comprising evaporating water and absorbing the vapor into an aqueous absorbent comprised of CsOH and at least one of KOH and NaOH.

8. The process according to claim 7 further comprised of supplying heat to the evaporation step at a temperature between 0° and 20° C. and removing heat from the absorption step at a temperature between 50° and 95° C.

9. The process according to claim 7 further comprised of maintaining the composition of the anhydrous component of the absorbent between 3 and 60% CsOh and between 20 and 80% of at least one of KOH and NaOH.

10. The process according to claim 7 further comprised of removing the absorbed water vapor from the absorbent by heating it to high temperature, condensing the desorbed water vapor, and removing useful heat from the condensing step.

11. A composition of matter for reversibly absorbing and desorbing water vapor comprised of an aqueous solution containing between 5 and 50 weight percent water and containing nonaqueous component comprised of between 3 and 60 weight percent of CsOH and between 20 and 80 weight percent of each of KOH and NaOH.

12. The composition of matter of claim 11 further comprised of between 0.1% and 5% of oxyanion salt of alkali metal as corrosion inhibitor.

13. The composition of matter according to claim 11 comprising between 20 and 80% each of KOH and NaOH and comprising between 0.1 and 3% of alkali metal nitrate.

14. The composition of matter according to claim 11 further comprised of minor amounts of at least one of RbOH and the alkaline earth hydroxides.

* * * * *